United States Patent Office 2,903,437
Patented Sept. 8, 1959

2,903,437

SEALING COMPOSITION COMPRISING A MIXTURE OF BROMINATED BUTYL RUBBER, POLYISOBUTYLENE AND CARBON BLACK, AND METHOD OF MAKING SAME

James E. Van Epp, Cornwall on the Hudson, N.Y., assignor to E. I. du Pont de Nemours and Company, Wilmington, Del., a corporation of Delaware No Drawing. Application August 27, 1956
Serial No. 606,226

9 Claims. (Cl. 260—41.5)

This invention relates to an elastomeric material and more particularly to an elastomeric sealing composition.

In many applications, sealing compositions of the prior art have been greatly deficient. When they are used to patch seams and joints on inert elastomeric linings such as the tank linings disclosed in my copending application Serial No. 484,537, now Patent No. 2,866,731, known sealing compositions blister, react chemically, or do not stick well. Since a lining is only as good as its weakest point, failure of known sealing compositions to form dense, tenacious, chemically resistant films negates the advantages of the inert linings to which they are applied. In addition, most known elastomeric sealing compositions must be cured at elevated temperatures; hence, when the compositions are used on the joints and seams of inert linings on large tanks and containers, it is necessary to heat the whole tank until the sealing composition is cured.

I have found a self-curing, chemically resistant sealing composition which forms a dense film that adheres well to inert elastomeric materials, especially butyl rubber.

The sealing composition of this invention contains approximately from 10 to 90 parts by weight of brominated butyl rubber and approximately from 90 to 10 parts by weight polyisobutylene for a total of 100 parts by weight, up to about 200 parts by weight of activated or amorphous carbon and curatives in an amount sufficient to cure the brominated butyl rubber. Preferably, the composition contains from 50 to 75 parts by weight of brominated butyl rubber and from 50 to 25 parts by weight of polyisobutylene for a total of 100 parts by weight, and from 50 to 100 parts of activated or amorphous carbon. A small amount of solvents such as methyl ethyl ketone, toluene and xylene are usually added to facilitate handling and application of the sealing composition.

The composition of this invention is prepared by the process which includes milling the brominated butyl rubber at an elevated temperature, adding polyisobutylene and inert carbon to the brominated butyl rubber to form a rubber stock, separately mixing, in polyisobutylene, sufficient curatives to complete the curing of the brominated butyl rubber and incorporating the resulting curative mixture in the rubber stock prior to use.

The brominated butyl rubber is the product obtained from the bromination of an interpolymer of isobutylene and isoprene such as the interpolymers called "Butyl," GR–I–15, GR–I–17, GR–I–18 and GR–I–50. The rubber is made by polymerizing from 70 to 99 parts by weight of isobutylene and 1 to 30 parts by weight of isoprene and contains from 0.5 to 50 percent of combined bromine. Preferably, the brominated butyl rubber is composed of from 95 to 98 parts by weight of isobutylene and 2 to 5 parts by weight of isoprene and contains from 1 to 8 percent by weight of combined bromine.

In preparing the sealing composition of this invention, the brominated butyl rubber is first milled at an elevated temperature of approximately from 200 to 400° F. and preferably about 300° F. This can be done conveniently on a conventional two-roll rubber mill, but other heavy milling apparatus can be used if desired. After any air bubbles in the brominated butyl rubber have been removed, the inert carbon and part of the polyisobutylene are mixed with the brominated butyl rubber, preferably at about the same temperature used for milling the brominated butyl rubber, and, for convenience in the same milling equipment. The remainder of the polyisobutylene is used as a vehicle for the separate curative mixture.

The polyisobutylene is a saturated, semi-solid polymer of isobutylene having a molecular weight of 10,000 to 140,000 and preferably of from 10,000 to 64,000.

The inert carbon can be either amorphous or activated carbon and includes, for example, furnace black, channel black, acetylene black and decolorizing charcoal. In some uses, where the body of a caulking compound, sealant or patching putty is not required, the inert carbon may be omitted. Thus in the broadest sense, the compositions of this invention can be devoid of the inert carbon and the expression "up to 200 parts by weight of inert carbon" as used herein is intended to include such compositions. For most uses, however, the presence of carbon is desirable and often essential.

After the carbon and polyisobutylene have been added to the brominated butyl rubber, the resulting rubber stock is cooled, chopped and kneaded. During the kneading, solvents can be added to facilitate handling. Activators, which speed the room temperature curing of the sealing composition, can be added to the rubber stock or to the curative mixture; they include, for example, 1,3-dichloro-5,5-dimethyl hydantoin, zinc oxide, lead oxide, lead dioxide, red lead ($Pb_3O_4$), stearic acid or polyparadinitrosobenzene.

Curatives for the brominated butyl rubber are mixed separately in a small portion of the polyisobutylene, usually about 1 to 20 parts by weight, then added to the rubber stock just prior to use. Curatives include, for example, p-quinone dioxime and sulfur.

Just before the sealing composition is to be used, the curative mixture is incorporated in the rubber stock. This can be done by working the two materials together by hand or by mixing them in a kneader or similar machine. Once the curative mixture is added to the rubber stock, the sealing compound will usually set up in from three to five hours, depending on the curatives and activators used and the relative amounts thereof. To apply the completely mixed composition, the surface or seam to be patched or sealed is cleaned with a solvent such as toluene, then the composition is merely pressed against the surface or seam.

The brominated butyl rubber-polyisobutylene-carbon sealing composition just described is particularly useful on joints and seams of inert elastomeric liners; however, by adding an epoxyhydroxy polyether resin to such a composition a stiffer and less sticky material is obtained which is particularly useful as a caulking compound. Up to about 150 and preferably 10 to 25 parts by weight of resin are added for every 100 parts by weight of brominated butyl rubber and polyisobutylene. A curative for the resin is also added to the rubber curative mixture.

The epoxyhydroxy polyether resin is a low molecular weight liquid polymer prepared by the condensation of a polyhydric phenol and an epihalohydrin or a polyepoxy compound. U.S. Patents 2,503,726, 2,582,985, 2,592,560 and 2,694,694, for instance, show the methods by which these resins are prepared. An example of such a polyether resin containing epoxy and hydroxy groups is the product obtained by condensing two moles of epichlorohydrin with one mole of the product frequently referred to as either bis-phenol or diphenylol propane and more specifically as 2,2-bis(p-hydroxyphenyl) propane. Epoxyhydroxy polyether resins are currently marketed by a number of suppliers under such names, for example, as "Epon" (Shell Chemical Corporation) and "Araldite" (Ciba Company, Inc.).

Polyhydric phenols which illustrate the type used to make these epoxyhydroxy polyether resins include resorcinol, hydroquinone, catechol, diphenylol propane, p,p-dihydroxydiphenyl and analogous polyhydric anthracenes and naphthalenes. Illustrative epoxyhydroxy contributing compounds for condensation with the polyhydric phenols are epichlorohydrin, epibromohydrin, epihalohydrins of mannitol, sorbitol and erythritol, glycerol dichlorohydrin, butylene diepoxide, bis(2,3-epoxypropyl)ether, and diepoxides of mannitol and sorbitol.

To prepare the sealing compound containing the epoxyhydroxy polyether resin, the inert carbon and polyisobutylene are added to the milled brominated butyl rubber, then the rubber stock is cooled, chopped and kneaded as previously described. During this kneading step, however, the epoxyhydroxy polyether resin, in addition to any solvents and activators, is added to the rubber stock. The curing agent for the epoxyhydroxy polyether resin is added to the rubber curatives. Curatives for the epoxyhydroxy polyether resin include, for example, diethylene triamine, dimethylamino propylamine, diethylamino propylamine, benzyldimethylamine, piperidine, pyridine and diethylamine.

After the curatives are mixed with the rubber stock, the sealing composition with the epoxyhydroxy polyether resin cures in about the same time as the composition without the resin, that is, it sets up in about three to five hours and attains full properties within about five days.

The compositions of this invention find particular use as sealants, patching putties and caulking compounds. The brominated butyl rubber-polyisobutylene inert carbon composition is especially useful on precured butyl rubber tank linings such as those disclosed in my copending application Serial No. 484,537. This composition forms a strongly adhering, dense, blister-free and chemically resistant film which requires no curing at elevated temperature. The composition with the additional epoxyhydroxy polyether resin makes an excellent self-curing and workable caulking compound and window putty.

The following examples are intended to illustrate the invention and are not intended to limit it in any way.

*Example I*

A rubber stock having the following composition was compounded:

| | Parts by weight |
|---|---|
| Brominated butyl rubber—"Hycar" 2202 (B. F. Goodrich Chemical Co.) | 75 |
| Polyisobutylene—"Vistanex" LM Type MS (Standard Oil Co. of N. J.) | 15 |
| Carbon black—Philblack A | 75 |
| Toluene | 40 |
| Dithiocarbamate activator—"Butyl Eight" (R. T. Vanderbilt Co.) | 7.5 |
| | 212.5 |

The stock was prepared by milling the brominated butyl rubber (which contained about 98% polyisobutylene and 2% isoprene and was brominated to about 3%) on a two-roll rubber mill at about 300° F. until all the air bubbles in the rubber were released. Next, the low molecular weight semi-solid polyisobutylene and carbon black were mixed with the rubber on the hot mill. Finally, the mixture was cooled, chopped and placed in a kneader where the toluene and dithiocarbamate activator were added. The resulting material had the consistency of bread dough.

Separately, a curative mixture having the following composition was prepared:

| | Parts by weight |
|---|---|
| Polyisobutylene—"Vistanex" LM Type MS (Standard Oil Co. of N. J.) | 10 |
| Red lead (Pb$_3$O$_4$) | 4 |
| p-Quinone dioxime | 2 |
| 1,3-dichloro-5,5-dimethyl hydantoin | 0.25 |
| | 16.25 |

The curative mixture was then mixed by hand with the rubber stock and the resulting sealing composition was applied immediately to the joints and seams of a butyl rubber tank lining. After standing five days at room temperature, the sealant had a dense, chemically resistant film which adhered tenaciously to the butyl rubber.

*Example II*

A rubber stock similar to that of Example I was hot milled at 300° F. on a two-roll rubber mill, then cooled, chopped and kneaded. Next, toluene and an epoxyhydroxy polyether resin having the following properties were added to the cooled and kneaded rubber stock:

Melting point 8–12° C.
Gardner-Holdt viscosity $Z_5$–$Z_{6+}$
Epoxide equivalent (grams resin per gram equivalent of epoxide) 190–210
Refractive index 1.573 (20° C.)
Equivalent weight (grams of resin to esterify 1 gram mole of monobasic acid) 80

The resulting material had the following composition:

| | Parts by weight |
|---|---|
| Brominated butyl rubber—"Hycar" 2202 | 75 |
| Polyisobutylene—"Vistanex" LM Type MS | 15 |
| Carbon black—Philblack A | 75 |
| Toluene | 67.5 |
| Epoxyhydroxy polyether resin | 15 |
| | 247.5 |

Just before the sealing composition was used, a mixture containing 4 parts by weight of red lead, 2 parts by weight of p-quinone dioxime, and 1.2 parts by weight of triethylene tetramine all dispersed in 10 parts by weight of the polyisobutylene was added to the rubber stock. The resulting sealing composition was suitable for a window putty or caulking compound and hardened to a dense, chemically resistant and adherent elastomer.

*Example III*

A rubber stock having the following composition was formed by the procedure described in Example II:

| | Parts by weight |
|---|---|
| Brominated butyl rubber—"Hycar" 2202 | 50.0 |
| Polyisobutylene—"Vistanex" LM Type MS | 30.0 |
| Carbon black | 50.0 |
| Polyisobutylene—"Vistanex" LM Type MS | 30.0 |
| ample II) | 100.0 |
| | 230.0 |

The mixture used to cure the rubber stock consisted of:

| | Parts by weight |
|---|---|
| p-Quinone dioxime | 2.0 |
| Red lead (Pb$_3$O$_4$) | 4.0 |
| Diethylenetriamine | 6.0 |
| TiO$_2$ | 1.0 |
| | 13.0 |

This mixture was dispersed in 20 parts of polyisobutylene, then incorporated in the rubber stock just before the sealing composition was used.

Example IV

A rubber stock consisting of "Hycar" 2202 brominated butyl, "Vistanex" LM Type MS polyisobutylene, and carbon black was hot milled at 300° F. After polyparadinitrosobenzene and stearic acid activators had been added to the stock, it was cooled. Next, p-quinone dioxime, toluene and the same epoxyhydroxy polyether resin used in Example II were added to the rubber stock to yield the following composition:

| | Parts by weight |
|---|---|
| Brominated butyl rubber | 50.0 |
| Polyisobutylene | 37.3 |
| Carbon black | 50.0 |
| Polyparadinitrosobenzene (75% inert) | 0.5 |
| Stearic acid | 1.0 |
| p-Quinone dioxime | 2.0 |
| Epoxyhydroxy polyether resin | 14.0 |
| Toluene | 22.0 |
| | 176.8 |

Before the sealing composition was used, a curative mixture consisting of 4 parts by weight of red lead and 0.8 part by weight of diethylene triamine all dispersed in 12.7 parts by weight of polyisobutylene was added to the rubber stock to form a finished caulking compound.

Example V

A rubber stock having the following composition was formed by the procedure described in Example IV:

| | Parts by weight |
|---|---|
| Brominated butyl rubber—"Hycar" 2202 | 25.0 |
| Polyisobutylene—"Vistanex" LM Type MS | 62.3 |
| Carbon black | 50.0 |
| Polyparadinitrosobenzene (75% inert) | 0.5 |
| Stearic acid | 1.0 |
| p-Quinone dioxime | 2.0 |
| Epoxyhydroxy polyether resin (same as Example II) | 15.3 |
| Toluene | 17.3 |
| | 173.4 |

The same curative mixture was used for this rubber stock as was used for the stock in Example IV.

I claim:

1. A sealing composition consisting essentially of about from 10 to 90 parts by weight of brominated rubber and approximately 90 to 10 parts by weight of polyisobutylene for a total of 100 parts by weight, about from 50 to 100 parts by weight of inert carbon selected from the group consisting of amorphous and activated carbon, and curatives in an amount sufficient to cure said brominated rubber, said brominated rubber comprising a copolymer of about from 70 to 99 parts by weight of isobutylene and about from 30 to 1 parts by weight of isoprene and containing about from 0.5 to 50% by weight of combined bromine.

2. A sealing composition of claim 1 wherein said brominated rubber comprises a copolymer of about from 95 to 98 parts by weight of isobutylene and about from 5 to 2 parts by weight of isoprene and contains about from 1 to 8% by weight of combined bromine.

3. A sealing composition consisting essentially of the composition of claim 1, up to about 150 parts by weight of epoxyhydroxy polyether resin, and curatives in an amount sufficient to cure said resin.

4. A sealing composition consisting essentially of about from 50 to 75 parts by weight of brominated rubber and about from 50 to 25 parts by weight of polyisobutylene for a total of 100 parts by weight, about from 50 to 100 parts by weight of inert carbon selected from the group consisting of amorphous and activated carbon, and curatives in an amount sufficient to cure said brominated rubber, said brominated rubber comprising a copolymer of about from 95 to 98 parts by weight of isobutylene and from about 5 to 2 parts by weight of isoprene and containing about from 1 to 8% by weight of combined bromine.

5. A sealing composition consisting essentially of the composition of claim 4, about from 10 to 25 parts by weight of epoxyhydroxy polyether resin and curatives in an amout sufficient to cure said resin.

6. A process which consists essentially of milling at an elevated temperature a brominated rubber comprising a copolymer of about from 70 to 99 parts by weight of isobutylene and about from 30 to 1 parts by weight of isoprene and containing about from 0.5 to 50% by weight of combined bromine, adding thereto polyisobutylene and inert carbon selected from the group consisting of amorphous and activated carbon to form a rubber stock, separately mixing, in polyisobutylene, curatives in an amount sufficient to cure the brominated rubber, and incorporating said curative mixture in said rubber stock prior to use.

7. A process which consists essentially of milling at an elevated temperature a brominated rubber comprising a copolymer of about from 70 to 99 parts by weight of isobutylene and about from 30 to 1 parts by weight of isoprene and containing about from 0.5 to 50% by weight of combined bromine, adding thereto polyisobutylene and inert carbon selected from the group consisting of amorphous carbon and activated carbon, cooling the rubber stock and incorporating therein an epoxyhydroxy polyether resin, separately mixing, in polyisobutylene, curatives in an amount sufficient to cure said brominated rubber and epoxyhydroxy polyether resin, and incorporating said curative mixture in said rubber stock prior to use.

8. A process which consists essentially of milling at an elevated temperature about from 50 to 75 parts by weight of brominated rubber comprising a copolymer of about from 95 to 98 parts by weight of isobutylene and about from 5 to 2 parts by weight of isoprene and containing about from 1 to 8% of combined bromine, adding thereto about from 49 to 5 parts by weight of polyisobutylene and about from 50 to 100 parts by weight of inert carbon selected from the group consisting of amorphous and activated carbon to form a rubber stock, separately mixing in about from 1 to 20 parts by weight of polyisobutylene, curatives in an amount sufficient to cure the brominated rubber, and incorporating said curative mixture in said rubber stock prior to use.

9. A process which consists essentially of milling at an elevated temperature about from 50 to 75 parts by weight of brominated rubber comprising a copolymer of about from 95 to 98 parts by weight of isobutylene and about from 5 to 2 parts by weight of isoprene and containing about from 1 to 8% by weight of combined bromine, adding thereto about from 49 to 5 parts by weight of polyisobutylene and about from 50 to 100 parts by weight of inert carbon selected from the group consiting of amorphous and activated carbon, cooling the resulting rubber stock and incorporating therein about from 10 to 25 parts by weight of epoxyhydroxy polyether resin, separately mixing, in about from 1 to 20 parts by weight of polyisobutylene, curatives in an amount sufficient to cure the brominated rubber and an epoxyhydroxy polyether resin and incorporating said curative mixture in said rubber stock prior to use.

References Cited in the file of this patent

UNITED STATES PATENTS

| 2,631,984 | Crawford et al. | Mar. 17, 1953 |
| 2,765,018 | Connell | Oct. 2, 1956 |

UNITED STATES PATENT OFFICE
CERTIFICATE OF CORRECTION

Patent No. 2,903,437                                        September 8, 1959

James E. Van Epp

It is hereby certified that error appears in the printed specification of the above numbered patent requiring correction and that the said Letters Patent should read as corrected below.

Column 4, lines 59 and 60, Example III should read as shown below instead of as in the patent –

Epoxyhydroxy polyether resin (same
            as Example II) – – – – – – – 100.0 column 6, line 61, for "consiting" read — consisting —.

Signed and sealed this 1st day of March 1960.

(SEAL)
Attest:

KARL H. AXLINE                                          ROBERT C. WATSON
Attesting Officer                                       Commissioner of Patents